United States Patent
Haldemann (10) Patent No.: US 10,128,707 B2
(45) Date of Patent: Nov. 13, 2018

(54) WINDING FOR AN ELECTRIC MACHINE HAVING TRANSPOSED BARS COMPRISED OF STACKS OF STRANDS

(71) Applicant: General Electric Technology GmbH, Baden (CH)

(72) Inventor: Johann Haldemann, Birr (CH)

(73) Assignee: General Electric GmbH, Baden (CH)

( * ) Notice: Subject to any disclaimer, the term of this patent is extended or adjusted under 35 U.S.C. 154(b) by 0 days.

(21) Appl. No.: 15/176,372

(22) Filed: Jun. 8, 2016

(65) Prior Publication Data
US 2016/0285333 A1    Sep. 29, 2016

Related U.S. Application Data

(63) Continuation of application No. PCT/EP2014/076397, filed on Dec. 3, 2014.

(30) Foreign Application Priority Data

Dec. 11, 2013  (EP) .................................. 13196660

(51) Int. Cl.
| | |
|---|---|
| *H02K 3/24* | (2006.01) |
| *H02K 3/14* | (2006.01) |
| *H02K 3/12* | (2006.01) |
| *H02K 9/19* | (2006.01) |
| *H02K 3/18* | (2006.01) |

(Continued)

(52) U.S. Cl.
CPC .................. *H02K 3/24* (2013.01); *H02K 3/14* (2013.01); *H02K 1/06* (2013.01); *H02K 1/16* (2013.01); *H02K 3/12* (2013.01); *H02K 3/18* (2013.01); *H02K 9/19* (2013.01); *H02K 9/22* (2013.01)

(58) Field of Classification Search
CPC .. H02K 3/14; H02K 3/24; H02K 1/06; H02K 1/16; H02K 3/12; H02K 3/18; H02K 9/19; H02K 9/22; H02K 55/04
USPC ....... 310/59, 52, 54, 64, 179, 201, 208, 213, 310/216.119, 254.1
See application file for complete search history.

(56) References Cited

U.S. PATENT DOCUMENTS

| | | | | |
|---|---|---|---|---|
| 2,821,641 A | * | 1/1958 | Ringland | H02K 3/14 310/213 |
| 3,188,377 A | * | 6/1965 | Hughes | H02K 3/14 174/33 |

(Continued)

FOREIGN PATENT DOCUMENTS

| | | |
|---|---|---|
| DE | 197 54 943 A1 | 6/1999 |
| DE | 100 59 385 A1 | 6/2002 |
| EP | 2262 079 A1 | 12/2010 |

OTHER PUBLICATIONS

Mueller et al., English Machine Translation of DE 10059385, Jun. 13, 2002.*

*Primary Examiner* — Bernard Rojas
*Assistant Examiner* — Rashad Johnson
(74) *Attorney, Agent, or Firm* — Global Patent Operation; Rita D. Vacca (57) ABSTRACT

The winding for an electric machine comprises transposed bars having at least four stacks of strands. Couples of stacks of strands define elementary transposed bars. The winding comprises at least two stacks of cooling pipes in each transposed bar, each stack of cooling pipes being arranged between two stacks of strands, and at least one crossover transposed bar in which the sides of the elementary transposed bars are exchanged.

5 Claims, 6 Drawing Sheets (51) Int. Cl.
    *H02K 9/22*         (2006.01)
    *H02K 1/06*         (2006.01)
    *H02K 1/16*         (2006.01)

(56) References Cited

U.S. PATENT DOCUMENTS

| | | | | |
|---|---|---|---|---|
| 3,647,932 | A * | 3/1972 | Heller | H02K 3/14 |
| | | | | 174/113 R |
| RE27,489 | E * | 9/1972 | Brenner | H02K 3/14 |
| | | | | 310/213 |
| 3,960,803 | A * | 6/1976 | Smith | H01B 3/48 |
| | | | | 156/330 |
| 5,323,079 | A | 6/1994 | Nieves et al. | |
| 5,633,477 | A * | 5/1997 | Smith | H02K 3/30 |
| | | | | 174/138 E |
| 5,708,315 | A | 1/1998 | Gould et al. | |
| 7,898,127 | B2 | 3/2011 | Maeda et al. | |
| 7,965,013 | B2 * | 6/2011 | Baenziger | H02K 3/38 |
| | | | | 174/138 R |
| 8,278,795 | B2 * | 10/2012 | Emery | H02K 3/40 |
| | | | | 310/196 |
| 8,630,688 | B2 * | 1/2014 | Zhang | H02K 3/14 |
| | | | | 310/179 |
| 2007/0152520 | A1 * | 7/2007 | Takahashi | H02K 3/12 |
| | | | | 310/65 |
| 2007/0222321 | A1 * | 9/2007 | Haldemann | H02K 3/14 |
| | | | | 310/213 |
| 2014/0159518 | A1 * | 6/2014 | Haldemann | H02K 3/24 |
| | | | | 310/59 |

\* cited by examiner

WINDING FOR AN ELECTRIC MACHINE HAVING TRANSPOSED BARS COMPRISED OF STACKS OF STRANDS

CROSS-REFERENCE TO RELATED APPLICATIONS

This application claims priority to PCT/EP2014/076397 filed Dec. 3, 2014, which claims priority to European Patent Application No. 13196660.8 filed Dec. 11, 2013, both of which are hereby incorporated in their entirety.

TECHNICAL FIELD

The present disclosure relates to a winding for an electric machine. The electric machine is a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

Electric machines have a stator and a rotor; the stator has axial slots that house transposed bars connected to each other to define a winding (typically a three-phase winding).

Figure 12:
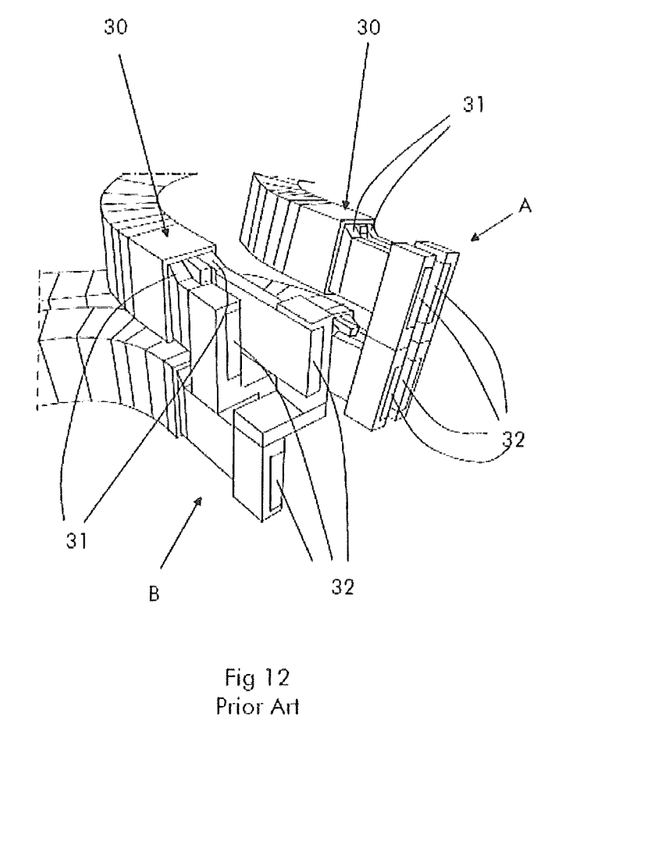
FIG. 12 is a schematic perspective view of connections between transposed bars in an electric machine according to the prior art, at the left, B, in the foreground with the shifted bars due to strand transpositions, and at the right, A, in the background with the bars adjusted in length.

With reference to FIG. 12, each slot 8 houses two transposed bars 30 one on top of the other. Each transposed bar 30 has four stacks of strands 15; the four stacks of strands 15 define two side-by-side elementary transposed bars 31. The elementary transposed bars 31 have terminal lugs 32 (usually solid copper blocks) that are connected together to define the winding. As can be seen on the left of FIG. 12, reference B, the bars 30 with the lugs 32 end at different positions, see especially the two bars 30 on top at the left side. The same applies to the bars 30 with lugs 32 at the bottom of the left side, where the left bar 30 is longer. The left bar 30 at the top at the left side in FIG. 12 is shorter than the adjacent right bar 30, which is also referred to as crossover connection. This misalignment of the end pieces of the bars 30 originates from the transpositions of the strands 15 of the bars 30 in the state of the art. This configuration is critical in terms of stresses in the material and the welding process to weld the bars 30. At the right of FIG. 12, reference A, the bars 30 are shown when adjusted in length and the corresponding lugs 32 at the end of the bars 30 are connected together, the strands 15 of the bars 30 are not transposed.

The document U.S. Pat. No. 7,898,127 discloses an embodiment in which radially aligned lugs are reciprocally connected (this connection is similar to the connection identified by reference A in FIG. 12).

This embodiment has the problem that during operation it causes large losses, because the position of the elementary transposed bars is not exchanged.

In another embodiment of U.S. Pat. No. 7,898,127, in addition to radially aligned lugs similar to those identified by reference A in FIG. 12, also crossover connections between lugs 32 are provided (these connections are similar to the connections identified by reference B in FIG. 12). The crossover connections connect the lugs 32 of an elementary transposed bar at the right of a transposed bar with an elementary transposed bar at the left of another transposed bar; this way a position exchange of the elementary transposed bar is achieved.

This embodiment allows lower losses, but crossover connections are difficult and time consuming to assemble.

SUMMARY

An aspect of the disclosure includes providing a winding with transposed bars having four stacks of strands defining two side-by-side elementary transposed bars that allows low losses but at the same time is easy and quick to assemble.

These and further aspects are attained by providing a winding in accordance with the accompanying claims.

BRIEF DESCRIPTION OF THE DRAWINGS

Further characteristics and advantages will be more apparent from the description of a preferred but non-exclusive embodiment of the winding, illustrated by way of non-limiting example in the accompanying drawings, in which.

DETAILED DESCRIPTION

With reference to the figures, an electric machine 1 such as an electric generator or motor is shown.

The electric machine 1 has a casing 2 that houses a stator 3 and a rotor 4 supported by shafts 5.

The stator 3 comprises a laminated stator core 6 that defines a bore 7 into which the rotor 4 is rotatably housed. The stator core 6 has slots 8 that open in the bore 7 and house the winding. The slots 8 are closed by wedges.

The winding is defined by transposed bars 9 connected together.

Each slot 8 houses two transposed bars 9, one on top of the other.

The transposed bars 9 have a straight part 10 that is housed into the slots 8 and curved end windings 11 that extend from the ends of the straight part 10 and are not housed into the slots 8, but envelop the shafts 5 and are connected together.

Figure 3:
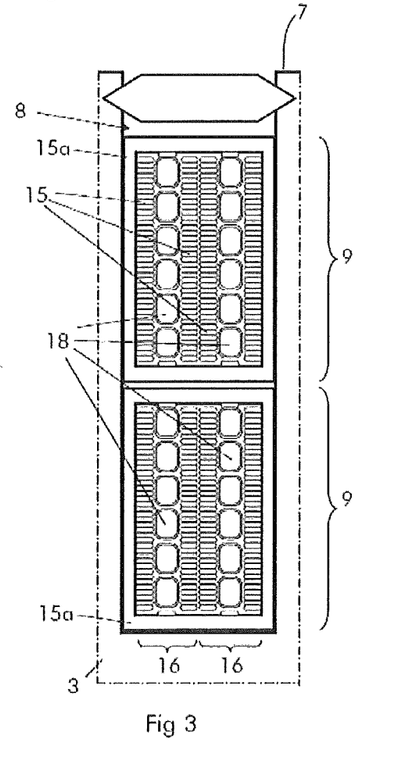
FIG. 3 is a cross section of a slot and of two transposed bars housed therein onto each other.

The transposed bars 9 have at least four stacks of strands 15; the strands 15 are typically slightly insulated from one another and are covered by a main insulation 15a. Couples of stacks of strands 15 define elementary transposed bars 16. FIG. 3 shows the slot 8 with inserted two conductor bars or transposed bars 9, one transposed bar 9 at the bottom and one transposed bar 9 at the top. The slot 8 is closed at the bottom and finished with a wedge at the top in this view. Generally, slots 8 of stators of electric machines are equipped with one transposed bar 9 or two transposed bars 9. The latter configuration of the slot 8 is shown in FIG. 3.

Figure 1:
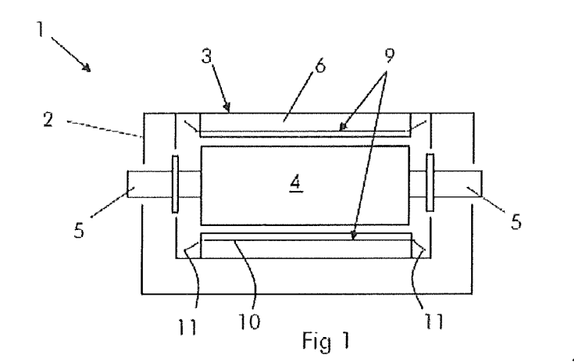
FIGS. 1 and 2 are a schematic side and front view of an electric machine with slots to house bars.
Figure 4:
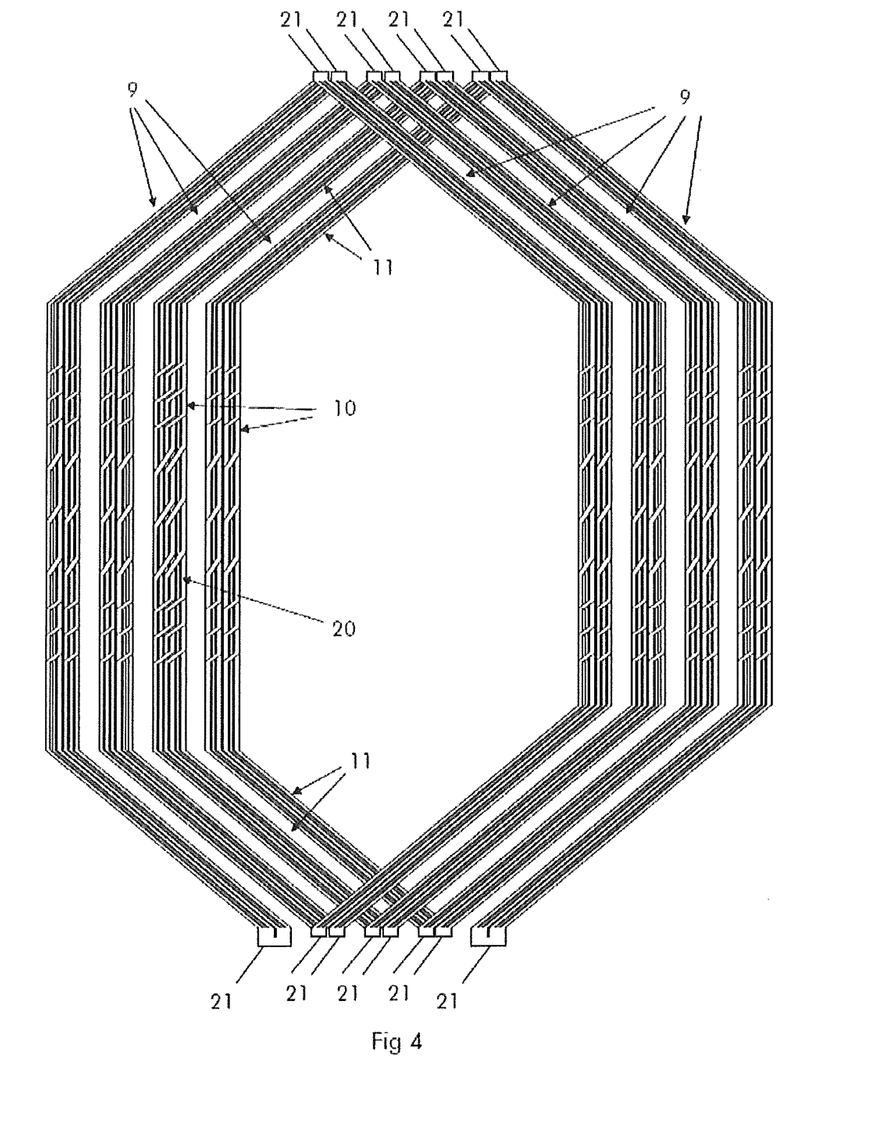
FIG. 4 is a schematic view of a winding in a first embodiment.
Figure 8:
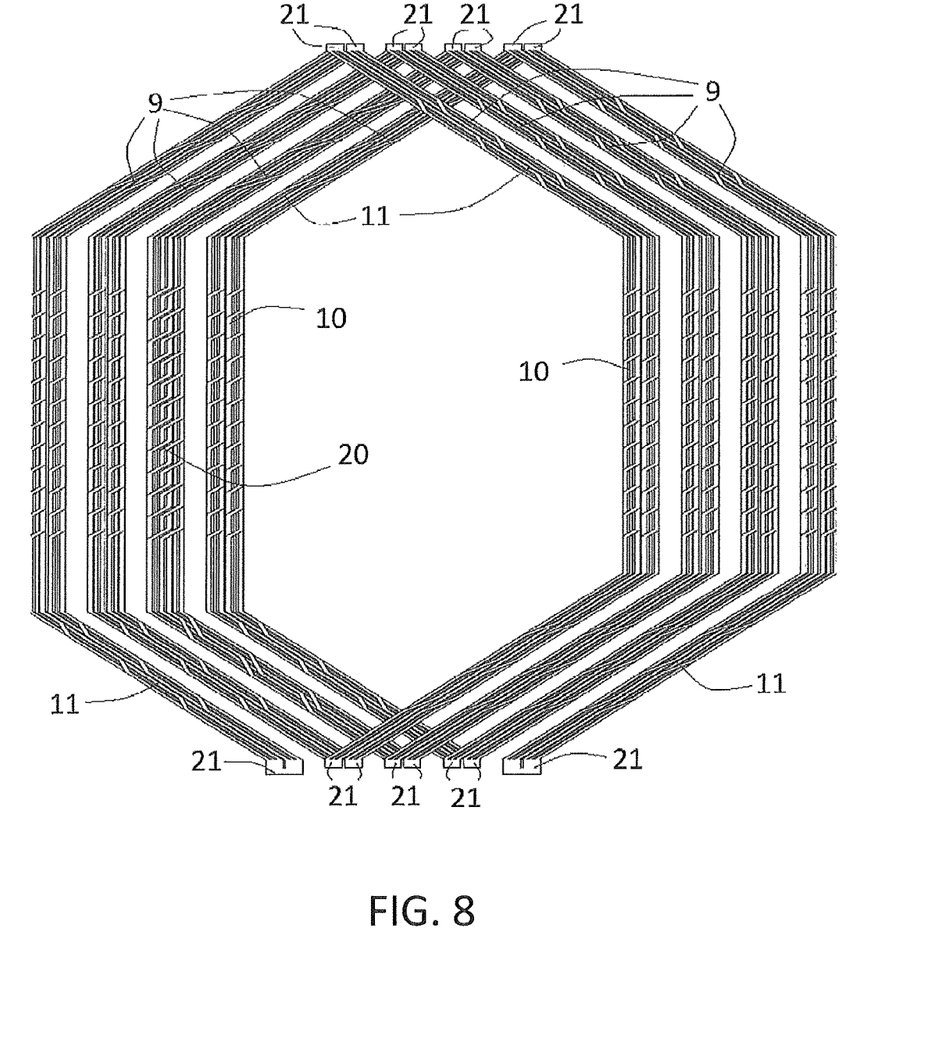
FIG. 8 is a schematic view of a winding in a second embodiment.

This means when one conductor bar or transposed bar 9 is arranged in the slot 8 and the two elementary transposed bars 16 which are comprised by the transposed bar 9 are arranged according to the invention, then one crossover transposed bar 20 is provided. In the alternative, when two conductor bars or transposed bars 9 are arranged in the slot 8 above each other four elementary transposed bars 16 are provided, a couple or two elementary transposed bars 16 comprised by each transposed bar 9. In this case when the four elementary transposed bars 16 are arranged according to the invention, two crossover transposed bars 20 are generated which are arranged above each other according to the perspective of FIG. 3, corresponding to the two transposed bars 9 from which the crossover transposed bars 20 are fabricated from. The transposed bars 9 are part of the winding of a stator 3 which is composed of straight and bended parts, as can be seen in the FIGS. 4 and 8. The straight parts 10 are accommodated in the slots 8, the bended parts, hereby referred to as end windings 11, are not housed in the slots 8 but freely arranged within the stator housing, stator frame, or casing 2, as can be seen in FIG. 1. FIGS. 4 and 8 show a winding with four pairs of crossover transposed bars 20 in the straight part 10 adapted to be placed into four slots 8 of the stator 3.

The transposed bars 9 also include stacks of cooling pipes 18 in which a cooling medium flows in operation. Each stack of cooling pipes 18 being arranged between two stacks of strands 15.

Advantageously, the cooling pipes 18 optimize cooling because each cooling pipe 18 is provided between strands 15.

In addition to the transposed bars 9 defining elementary transposed bars 16, the winding also includes at least one crossover transposed bar 20.

Figure 5:
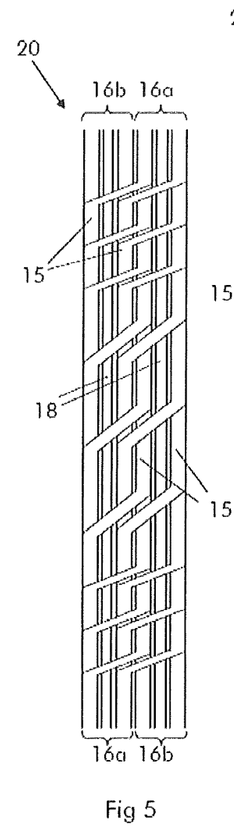
FIGS. 5 through 7 are schematic top views of a crossover bar of the winding of FIG. 4.

A crossover transposed bar 20 is a bar in which the sides of the elementary transposed bars 16 are exchanged. Also, the crossover transposed bar 20 has a straight part 10 and end windings 11. For example, with reference to FIG. 5, the crossover transposed bar 20 comprises the elementary transposed bar 16a and the elementary transposed bar 16b. As shown in FIG. 5 regarding the elementary transposed bar 16a:
  at one end of the crossover transposed bar 20 (top of FIG. 5) the elementary transposed bar 16a is on the right side of the crossover transposed bar 20, and
  at the other end of the crossover transposed bar 20 (bottom of FIG. 5) the elementary transposed bar 16a is on the left of the crossover transposed bar 20;
likewise, regarding the elementary transposed bar 16b:
  at one end of the crossover transposed bar 20 (top of FIG. 5) the elementary transposed bar 16b is on the left side of the crossover transposed bar 20, and
  at the other end of the crossover transposed bar 20 (bottom of FIG. 5) the elementary transposed bar 16b is on the right of the crossover transposed bar 20.

This configuration allows the reduction of losses. In addition the winding can be manufactured by using only connections between radially aligned lugs 21 (similar to the connections A of FIG. 12) and without crossover connections; this allows easy and quick assembling of the winding. Radially alignment thus means that the end parts of the transposed bars 9 finished with lugs 21 end essentially at the same position.

Figure 2:
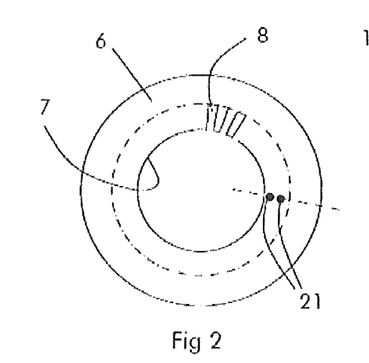

Each elementary transposed bar 16 has a lug 21 at its ends; the lugs 21 of the elementary transposed bars 16 that are connected together are radially aligned (radially with reference to the annular stator core 6, FIG. 2).

Typically, each transposed bar 9 that is housed at a top position in a slot 8 is connected with two bars 9 (one at each end) that are housed at bottom positions in other slots 8.

The crossover transposed bar 20 has a transposition greater than or equal to 540 degree; in addition the transposition is a multiple of 180 degree. This way independently of the number of turns of the elementary transposed bars 16, the elementary transposed bars 16 exchange their position within the crossover bar 20. Preferably, also the transposed bars 9 have a transposition greater than or equal to 540 degree which is a multiple of 180 degree.

Figures 6, 7:
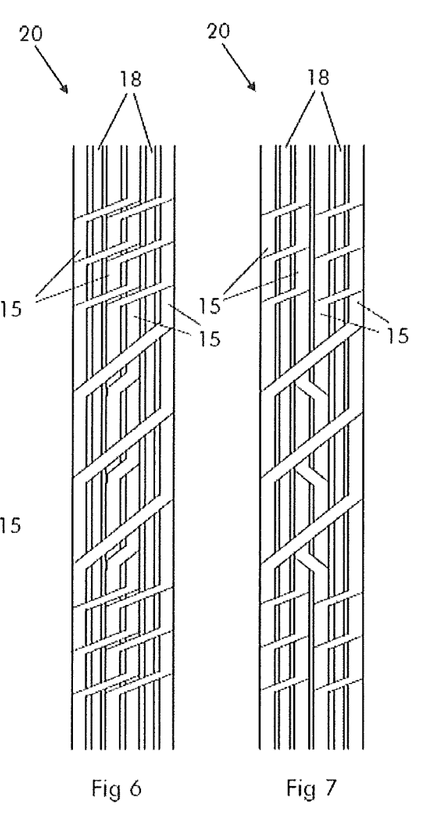

In a first example shown in FIG. 5 only the straight part 10 of the transposed bars 9 and crossover transposed bar 20 is transposed. In this case the straight part 10 has a transposition greater than or equal to 540 degree, a multiple of 180 degree; FIG. 5 shows an example of the transposition of 540 degree at the straight part 10 and 0 degree at the end windings 11 of the transposed bars 9 and crossover transposed bar 20. FIGS. 6 through 8 show different examples of crossover transposed bars 20.

Figures 9, 10, 11:
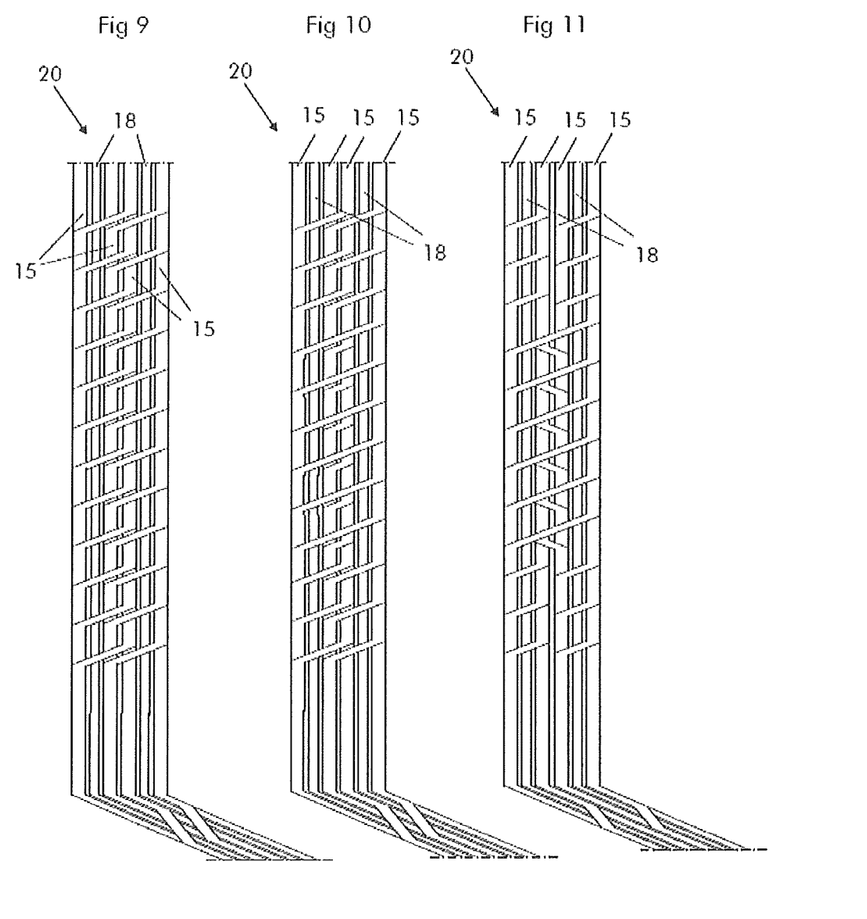
FIGS. 9 through 11 are schematic top views of a crossover bar of the winding of FIG. 8.

In a second example shown for example in FIG. 9 both the straight parts 10 and the end windings 11 of the transposed bars 9 and crossover transposed bar 20 are transposed. In this case both the straight part 10 and the end windings 11 have together a transposition greater than or equal to 540 degree and a multiple of 180 degree; FIG. 9 shows an example of a transposition of 360 degree at the straight part 10 and 90 degree at each of the end winding 11. FIGS. 10 through 12 show different examples of crossover transposed bars 20.

The operation of the winding is apparent from the description and illustration and is substantially the following.

During assembly, all lugs 21 at the end of the elementary transposed bars 16 are radially aligned.

Their connection can thus be easily achieved by providing a conductor between the lugs 21 (but the conductor could be avoided) and a clamp to block the lugs 21; then the lugs 21 and the conductor (when provided) can be brazed together. This is easy and quick because the lugs 21 are radially aligned (FIG. 2). No crossover connections are needed (i.e. lugs 21 that connect an elementary transposed bar 16 at one side of a transposed bar to an elementary transposed bar 16 at the other side of another transposed bar similar to the connection B of FIG. 12). Thus, troubles associated with brazing of lugs 21 with a crossover connection (such as difficulties in clamping the lugs 21 that are not aligned) are avoided. The crossover connections are obviated by the specific winding having the transposition scheme of the strands 15 with a crossover transposition according to the invention described.

During operation the winding is electrically balanced thanks to the exchange of the elementary transposed bars 16, losses are thus reduced.

In addition, thanks to the plurality of cooling channels or cooling pipes 18 between couples of strands 15, cooling is optimised.

In practice the materials used and the dimensions can be chosen at will according to requirements and to the state of the art.

The invention claimed is:
1. A winding for an electric machine comprising:
  transposed bars having at least four stacks of strands, wherein couples of stacks of strands of the at least four stacks of strands define elementary transposed bars, with each elementary transposed bar comprising a straight part and end windings;

at least two stacks of cooling pipes with each stack of cooling pipes arranged in an elementary transposed bar between two strands forming a couple of stacks of strands;

a solitary solid block lug finishing an end of each elementary transposed bar, with two solitary solid block lugs of two elementary transposed bars connected together and radially aligned; and at least one crossover transposed bar in which the couple of stacks of strands in both the straight part and the end windings of one elementary transposed bar is exchanged with the couple of stacks of strands in both the straight part and the end windings of another elementary transposed bar by a first stack of strands of a first elementary transposed bar exchanged with a nonadjacent second stack of strands of a second elementary transposed bar with the second stack of strands being in closest proximity to the first stack of strands, and parallel thereto a third stack of strands from the first elementary transposed bar exchanged with a nonadjacent fourth stack of strands of the second elementary transposed bar with the fourth stack of strands being in farthest proximity from the third stack of strands, and thereafter by the first stack of strands of the first elementary transposed bar exchanged with the fourth stack of strands of the second elementary transposed bar, and nonparallel thereto, the second stack of strands from the second elementary transposed bar exchanged with the third stack of strands of the first elementary transposed bar, wherein the at least one crossover transposed bar has a transposition greater than or equal to 540 degrees which is a multiple of 180 degrees.

2. The winding according to claim 1, wherein a transposed bar of the transposed bars has a transposition greater than or equal to 540 degrees which is a multiple of 180 degrees.

3. The winding according to claim 1, wherein the straight part and the end windings of the elementary transposed bars are arranged with a curved end winding at each end of the straight part.

4. The winding according to claim 1, wherein the straight part and the end windings of the at least one crossover transposed bar are arranged with a curved end winding at each end of the straight part.

5. A stator of an electric machine comprising:
a laminated stator core with a central bore and axial slots in the laminated stator core opening in the central bore; and a winding housed in the axial slots, with the winding according to claim 1.

\* \* \* \* \*